US010045072B2

(12) United States Patent
Cho et al.

(10) Patent No.: US 10,045,072 B2
(45) Date of Patent: Aug. 7, 2018

(54) CONTENT REPRODUCING APPARATUS AND METHOD, AND CONTENT PROVIDING APPARATUS AND METHOD

(71) Applicant: NAVER CORPORATION, Seongnam-si, Gyeonggi-do (KR)

(72) Inventors: Sung Tak Cho, Seongnam-si (KR); Kyung Ryul Sun, Seongnam-si (KR); Sung Ho Kim, Seongnam-si (KR); Yoo Sub Song, Seongnam-si (KR); Joon Kee Chang, Seongnam-si (KR); Haneul Lee, Seongnam-si (KR); Kuk Hwan Seo, Seongnam-si (KR); Seong Cheol Jo, Seongnam-si (KR); Seung Ahe Yi, Seongnam-si (KR)

(73) Assignee: Naver Corporation, Gyeonggi-do (KR)

( * ) Notice: Subject to any disclaimer, the term of this patent is extended or adjusted under 35 U.S.C. 154(b) by 21 days.

(21) Appl. No.: 14/663,614

(22) Filed: Mar. 20, 2015

(65) Prior Publication Data

US 2015/0281771 A1 Oct. 1, 2015

(30) Foreign Application Priority Data

Apr. 1, 2014 (KR) .................. 10-2014-0038474
Nov. 3, 2014 (KR) .................. 10-2014-0151048

(51) Int. Cl.
*H04N 21/44* (2011.01)
*H04N 21/472* (2011.01)
(Continued)

(52) U.S. Cl.
CPC ... *H04N 21/44004* (2013.01); *H04N 21/4728* (2013.01); *H04N 21/47217* (2013.01); *H04N 21/8456* (2013.01)

(58) Field of Classification Search
None
See application file for complete search history.

(56) References Cited

U.S. PATENT DOCUMENTS

2002/0133247 A1 9/2002 Smith et al.
2003/0197785 A1* 10/2003 White .................. G11B 27/034
348/207.99
(Continued)

FOREIGN PATENT DOCUMENTS

CN 101106514 A 1/2008
CN 102165787 A 8/2011
(Continued)

OTHER PUBLICATIONS

Office Action for corresponding Taiwanese Application No. 10521293310 dated Oct. 21, 2016.
(Continued)

*Primary Examiner* — Ryan D McCulley
(74) *Attorney, Agent, or Firm* — Harness, Dickey & Pierce, P.L.C.

(57) ABSTRACT

In at least one example embodiment, a content reproducing apparatus includes a display, a memory configured to store at least one program and a processor. The processor is configured to reproduce first moving image content of a plurality of moving image content selected by a user, on a first region of a screen of the display, according to a user input, display a plurality of thumbnail images corresponding to the plurality of moving image content, on a second region of the screen, buffer a second moving image content corresponding to one of the plurality of thumbnail images, the first moving image content being continuously reproduced while the second moving image content is being buffered, and reproduce the second moving image content instead of
(Continued)

the first moving image content when the buffering of the second moving image content is completed.

20 Claims, 7 Drawing Sheets

(51) Int. Cl.
*H04N 21/4728* (2011.01)
*H04N 21/845* (2011.01)

(56) References Cited

U.S. PATENT DOCUMENTS

| | | | |
|---|---|---|---|
| 2006/0023066 A1* | 2/2006 | Li | H04N 21/21805 348/159 |
| 2007/0204238 A1* | 8/2007 | Hua | G06F 17/30817 715/838 |
| 2008/0015718 A1 | 1/2008 | Yoneda et al. | |
| 2009/0207316 A1* | 8/2009 | Cupal | G11B 27/28 348/700 |
| 2010/0031162 A1* | 2/2010 | Wiser | G06Q 30/0255 715/747 |
| 2010/0208082 A1* | 8/2010 | Buchner | H04H 20/18 348/207.1 |
| 2012/0236201 A1* | 9/2012 | Larsen | H04N 21/235 348/468 |
| 2014/0267098 A1* | 9/2014 | Na | G06F 3/041 345/173 |
| 2015/0007223 A1* | 1/2015 | Molinie | H04N 21/47 725/37 |

FOREIGN PATENT DOCUMENTS

| | | | |
|---|---|---|---|
| JP | 2002-142203 | A | 5/2002 |
| JP | 2004-247832 | A | 9/2004 |
| JP | 2004-364227 | A | 12/2004 |
| JP | 2005-159882 | A | 6/2005 |
| JP | 2005-278123 | A | 10/2005 |
| JP | 2006-166249 | A | 6/2006 |
| JP | 2006-520039 | A | 8/2006 |
| JP | 2008-022509 | A | 1/2008 |
| JP | 2009-141895 | A | 6/2009 |
| JP | 2009-194453 | A | 8/2009 |
| JP | 2010-081540 | A | 4/2010 |
| JP | 2012-065110 | A | 3/2012 |
| JP | 2013-110640 | A | 6/2013 |
| KR | 20060068985 | | 6/2006 |
| KR | 20080013072 | A | 2/2008 |
| KR | 100859663 | B1 | 9/2008 |
| WO | WO-2004/075077 | A1 | 9/2004 |

OTHER PUBLICATIONS

Japanese Office Action dated Mar. 29, 2016 issued in corresponding Japanese Patent Application No. 2015-068346 (English translation not provided).

Korean Office Action dated Mar. 16, 2016 for corresponding Korean Patent Application No. 10-2015-0030444.

Korean Office Action dated Oct. 19, 2016 for corresponding Korean Patent Application No. 10-2015-0030444.

Chinese Office Action dated Oct. 24, 2017 for corresponding Chinese Patent Application No. 201510147787.9.

Japanese Office Action for corresponding Japanese Application No. 2017-064891 dated Apr. 24, 2018.

* cited by examiner

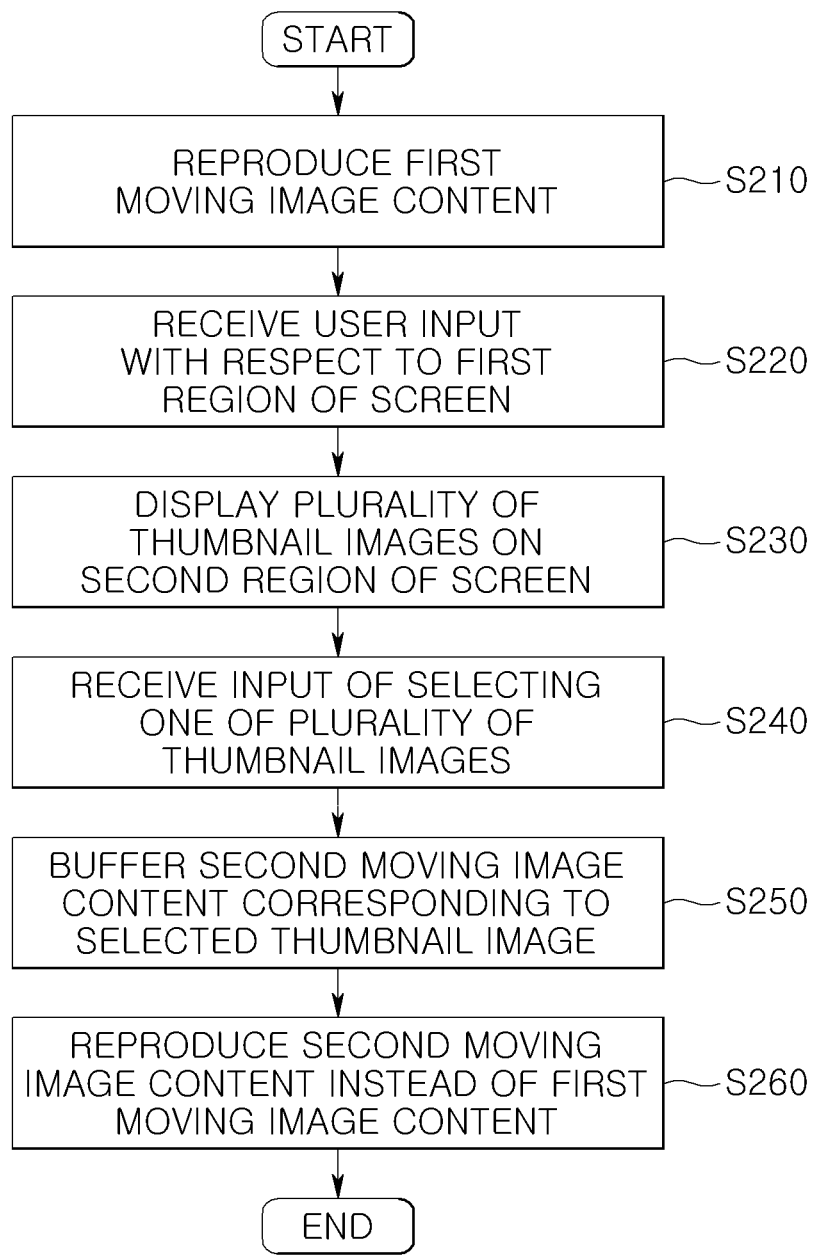

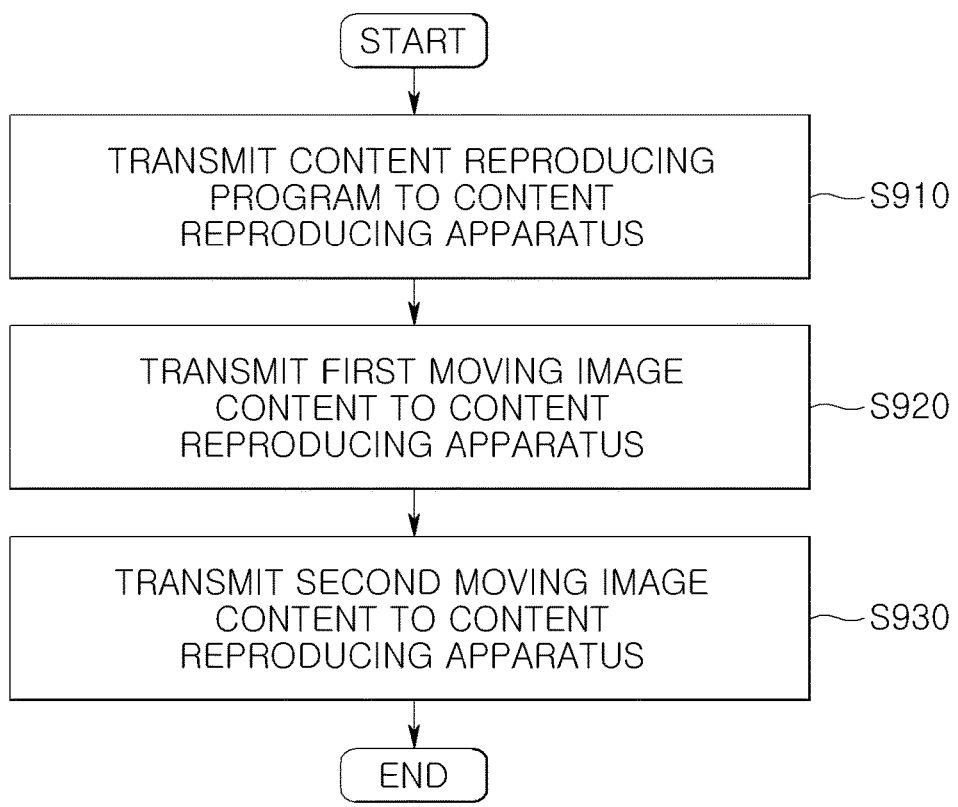

CONTENT REPRODUCING APPARATUS AND METHOD, AND CONTENT PROVIDING APPARATUS AND METHOD

RELATED APPLICATION

This application claims priority from and the benefit of Korean Patent Application No. 10-2014-0038474 filed on Apr. 1, 2014, which is hereby incorporated by reference in its entirety for all purposes as if fully set forth herein. This application also claims priority from and the benefit of Korean Patent Application No. 10-2014-0151048 filed on Nov. 3, 2014, which is hereby incorporated by reference in its entirety for all purposes as if fully set forth herein.

BACKGROUND OF THE INVENTION

1. Field of the Invention

Example embodiments relate to content reproducing apparatuses and methods, and content providing apparatuses and methods. More particularly, example embodiments relate to content reproducing apparatuses and methods, which reproduce multi-content, and content providing apparatuses and methods, which provide multi-content to a content reproducing apparatus.

2. Description of the Related Art

With an increase in network speeds, demands for moving image content are increasing. Users generate and share user created content (UCC) with other users worldwide through a web server or a social network service (SNS).

Moreover, general text-based and image-based web search systems are expanding to moving image-based web search systems, and various types of moving image related tools, such as moving image reproducing programs and moving image editing programs, are being developed.

SUMMARY OF THE INVENTION

Example embodiments are directed to content reproducing apparatuses and methods, and content providing apparatuses and methods, in which a new type of moving image content is provided to users so as to increase consumption of the users on moving image content.

In at least one example embodiment, a content reproducing apparatus includes a display, a memory configured to store at least one program and a processor. The processor is configured to reproduce first moving image content of a plurality of moving image content selected by a user, on a screen of the display, according to a user input, with respect to a first region of the screen, display a plurality of thumbnail images corresponding to the plurality of moving image content, on a second region of the screen, buffer a second moving image content corresponding to one of the plurality of thumbnail images, the first moving image content being continuously reproduced while the second moving image content is being buffered, and reproduce the second moving image content instead of the first moving image content when the buffering of the second moving image content is completed.

In at least one example embodiment, the processor is configured to display a buffering degree of the second moving image content on the one of the plurality of thumbnail images displayed on the second region.

In at least one example embodiment, the processor is configured to display the buffering degree by gradually increasing a buffer degree indicator from one point on the one of the plurality of thumbnail images to another point on the one of the plurality of thumbnail images.

In at least one example embodiment, the one point is one edge of the one of the plurality of thumbnail images, and the other point is another edge of the one of the plurality of thumbnail images.

In at least one example embodiment, the processor is configured to change the one of the plurality of thumbnail images while the second moving image content is buffered.

In at least one example embodiment, when the second moving image content has to be paid for prior to being reproduced, the processor is configured to display an image on the one of the plurality of thumbnail images indicating that the second moving image content has to be paid for prior to being reproduced.

In at least one example embodiment, the processor is configured to buffer the second moving image content after the second moving image content is paid for.

In at least one example embodiment, the processor is configured to display an image indicating that the plurality of moving image content are reproducible on the first region of the screen before displaying the plurality of thumbnail images on the second region of the screen.

In at least one example embodiment, the processor is configured to display the plurality of thumbnail images on the second region of the screen only when a user input with respect to the first region of the screen is received while the image indicating that the plurality of moving image content are reproducible is displayed on the first region of the screen.

In at least one example embodiment, the processor is configured to display the image indicating that the plurality of moving image content are reproducible during a portion of a reproduction time of the first moving image content, the portion of the reproduction time being a time period in which the first moving image content and the plurality of moving image content overlap.

In at least one example embodiment, the processor is configured to reproduce commercial content corresponding to the first moving image content when the commercial content corresponding to the first moving image content exists, and reproduce commercial content corresponding to the second moving image content when the commercial content corresponding to the second moving image content exists.

In at least one example embodiment, the processor is configured to buffer the second moving image content based on an amount of time over which the first moving image content is being displayed.

In at least one example embodiment, the plurality of moving image content include audio and video content, and the processor is configured to continuously reproduce the audio content without interruption when the processor switches to reproducing the second moving image content instead of the first moving image content.

In at least one example embodiment, the processor is configured to buffer the second moving image content based on a point of time at which a previous reproduction of the second moving image content was terminated.

In at least one example embodiment, when the previous reproduction of the second moving image content has been completed, the processor is configured to display a display termination image on the screen indicating that the reproduction of the second moving image content has been completed.

In at least one example embodiment, the processor is configured to display an image indicating that the reproduction of the first moving image content is in progress, the processor displaying the image on one of the plurality of thumbnail images corresponding to the first moving image content.

In at least one example embodiment, while the second moving image content is reproduced, the processor is configured to display another image indicating that the reproduction of the second moving image content is in progress, the processor displaying the other image on the one of the plurality of thumbnail images corresponding to the second moving image content.

In at least one example embodiment, the processor is configured to store a reproduction change history of each of the plurality of moving image content in the memory.

In at least one example embodiment, a content reproducing method performed by a content reproducing apparatus includes reproducing on a screen, first moving image content of a plurality of moving image content selected by a user and according to a user input with respect to a first region of the screen, displaying a plurality of thumbnail images corresponding to the plurality of moving image content, on a second region of the screen. The method further includes buffering a second moving image content corresponding to one of the plurality of thumbnail images, the first moving image content being continuously reproduced while the second moving image content is being buffered and reproducing the second moving image content instead of the first moving image content when the buffering completes the buffering of the second moving image content.

In at least one example embodiment, a computer readable medium including computer-program product, the computer-program product including instructions which when executed by a processor cause the processor to perform reproducing on a first region of a screen, first moving image content of a plurality of moving image content selected by a user and according to a user input, displaying a plurality of thumbnail images corresponding to the plurality of moving image content, on a second region of the screen. The instructions which when executed by the processor further cause the processor to perform buffering a second moving image content corresponding to one of the plurality of thumbnail images, the first moving image content being continuously reproduced while the second moving image content is being buffered and reproducing the second moving image content instead of the first moving image content when the buffering completes the buffering of the second moving image content.

In at least one example embodiment, content providing method performed by a content providing apparatus includes transmitting a content reproducing program to a content reproducing apparatus according to a request received from the content reproducing apparatus and transmitting first moving image content of a plurality of moving image content selected by the content reproducing apparatus through the content reproducing program, to the content reproducing apparatus. The method further includes transmitting a second moving image content to the content reproducing apparatus, according to a user input received via the content reproducing apparatus, the user input indicating a selection of one of a plurality of thumbnail images displayed on a screen of the content reproducing apparatus, the plurality of thumbnail images respectively corresponding to one of the plurality of moving image content. While the second moving image content is being buffered, the content reproducing program maintains reproducing the first moving image content, and when buffering of the second moving image content is completed, the content reproducing program reproduces the second moving image content instead of the first moving image content.

In at least one example embodiment, a computer readable medium including computer-program product, the computer-program product including instructions which when executed by a processor cause the processor to perform transmitting a content reproducing program to a content reproducing apparatus according to a request received from the content reproducing apparatus and transmitting first moving image content of a plurality of moving image content selected by the content reproducing apparatus through the content reproducing program, to the content reproducing apparatus. The instructions which when executed by the processor further cause the processor to perform transmitting a second moving image content to the content reproducing apparatus, according to a user input received via the content reproducing apparatus, the user input indicating a selection of one of a plurality of thumbnail images displayed on a screen of the content reproducing apparatus, the plurality of thumbnail images respectively corresponding to one of the plurality of moving image content, wherein, while the second moving image content is being buffered, the content reproducing program maintains reproducing the first moving image content and when buffering of the second moving image content is completed, the content reproducing program reproduces the second moving image content instead of the first moving image content.

BRIEF DESCRIPTION OF THE DRAWINGS

The inventive concepts will be more clearly understood from the following detailed description taken in conjunction with the accompanying drawings, in which:

FIG. 2 is a flowchart of a content reproducing method according to at least one example embodiment;

FIG. 9 is a flowchart of a content providing method, according to at least one example embodiment.

DETAILED DESCRIPTION OF EXAMPLE EMBODIMENTS

Figure 1:
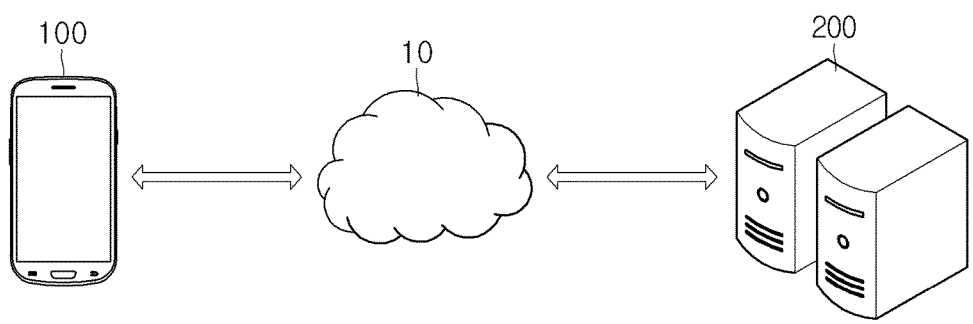
FIG. 1 is a diagram of a content reproducing apparatus and a content providing apparatus, according to at least one example embodiment.

Hereinafter, example embodiments will be described in detail with reference to the accompanying drawings. While inventive concepts will be described in conjunction with example embodiments thereof, it is to be understood that the present description is not intended to limit inventive concepts to the described example embodiments. On the contrary, inventive concepts is intended to cover not only example embodiments, but also various alternatives, modifications, equivalents and other embodiments that may be included within the spirit and scope of inventive concepts as defined by the appended claims. In drawings, like reference numerals denote like elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, areas, layers and/or sections, these elements, components, areas, layers and/or sections should not be limited by these terms. These terms are only used to distinguish one element, component, area, layer or section from another element, component, area, layer or section. Thus, a first element, component, area, layer or section discussed below could be termed a second element, component, area, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list. Unless otherwise defined, all terms (including technical and scientific terms) used herein have the same meaning as commonly understood by one of ordinary skill in the art to which example embodiments belong.

It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

According to example embodiments of inventive concepts, the word "unit" may refer to a software component or hardware component such as an FPGA or ASIC capable of carrying out a function or an operation. However, "unit" is not limited to hardware or software. A unit may be configured so as to reside in an addressable storage medium or to drive one or more processors. Units may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units, or further divided into units along with other components.

Herein, 'multi-content' denotes content including information about a plurality of pieces of moving image content that are pre-determined to be related to each other, or including the plurality of pieces of moving image content themselves. The information about the plurality of pieces of moving image content may include a uniform resource locator (URL) address for buffering each of the plurality of pieces of moving image content and information about charged moving image content from among the plurality of pieces of moving image content, but is not limited thereto.

Herein, the term 'reproduction' may refer to reproducing content on a display (e.g., displaying content on a display). Accordingly, throughout the disclosure and the discussion of example embodiments, the terms 'reproduce'/'reproduction' and 'display'/'displaying' may be used interchangeably.

FIG. 1 is a diagram of a content reproducing apparatus and a content providing apparatus, according to at least one example embodiment.

First, referring to FIG. 1, the content reproducing apparatus 100 and the content providing apparatus 200 are connected to each other via a network 10. The network 10 may include a wired network and a wireless network, and in detail, may include various networks, such as a local area network (LAN), a metropolitan area network (MAN), and a wide area network (WAN). Also, the network 10 may include a well-known world wide web (WWW). However, the network 10 is not limited thereto, and may include at least a part of a well-known wireless data network or a well-known telephone network, and a well-known wired/wireless television (TV) network.

In at least one example embodiment, the content reproducing apparatus 100 requests the content providing apparatus 200 for content, and reproduces (e.g., displays) the content provided from the content providing apparatus 200.

In at least one example embodiment, the content reproducing apparatus 100 may request the content providing apparatus 200 for the content through a content reproducing program provided in the content providing apparatus 200. In FIG. 1, the content reproducing apparatus 100 is a smart phone, but the content reproducing apparatus 100 is not limited to only a smart phone, but may be any device that may access the network 10 and receive content from the content providing apparatus 200, including, but not limited to, a desktop computer, a laptop, a personal digital assistant (PDA), a web pad, and a tablet personal computer (PC).

In at least one example embodiment, the content providing apparatus 200 may store a plurality of pieces of content that may be provided to the content reproducing apparatus 100, and transmit the content reproducing program and the content to the content reproducing apparatus 100 according to a request from the content reproducing apparatus 100. The content providing apparatus 200 may include a web server that provides a web service to the content reproducing apparatus 100.

Hereinafter, detailed operations of the content reproducing apparatus 100 will be described with reference to FIG. 2.

FIG. 2 is a flowchart of a content reproducing method according to at least one example embodiment.

At S210, the content reproducing apparatus 100 reproduces first moving image content included in multi-content selected by a user. The content reproducing apparatus 100 may store a content reproducing program for reproducing the first moving image content.

When the multi-content is selected by the user, the content reproducing apparatus 100 may reproduce the first moving image content of the multi-content selected by the user.

According to at least one example embodiment, when the multi-content is selected by the user, the content reproducing apparatus 100 may display a thumbnail image of each of a plurality of pieces of moving image content included in the multi-content on a screen of the content reproducing apparatus 100, and receive and reproduce the first moving image content corresponding to a thumbnail image selected by the user from the content providing apparatus 200. The thumbnail image corresponding to each of the plurality of pieces of moving image content may be transmitted from the content providing apparatus 200 to the content reproducing apparatus 100.

At S220, the content reproducing apparatus 100 receives a user input with respect to a first region of the screen.

The user input with respect to the first region of the screen may be a touch input with respect to the first region, a mouse click input with respect to the first region, or an input of locating a mouse cursor on the first region, but is not limited thereto.

At S230, the content reproducing apparatus 100 displays a plurality of the thumbnail images respectively corresponding to the plurality of pieces of moving image content included in the multi-content, on a second region of the screen, according to the user input with respect to the first region. In at least one example embodiment, the first and second regions may be the same or different from each other.

An image indicating that the plurality of pieces of moving image content included in the multi-content are reproducible may be displayed in the first region of the screen. In other words, the user may look at the image indicating that the plurality of pieces of moving image content included in the multi-content are reproducible, and input a certain user input to the first region where the image is displayed to watch the plurality of thumbnail images respectively corresponding to the plurality of pieces of moving image content.

At S240, the content reproducing apparatus 100 receives an input of the user selecting one of the plurality of thumbnail images displayed on the screen.

At S250, the content reproducing apparatus 100 receives and buffers second moving image content corresponding to the thumbnail image selected by the user, from the content providing apparatus 200. At this time, the content reproducing apparatus 100 continuously reproduces the first moving image content without stopping, until the buffering of the second moving image content is completed.

At S260, when the buffering of the second moving image content is completed, the content reproducing apparatus 100 stops reproducing the first moving image content and reproduces the second moving image content.

According to at least one example embodiment, a user may watch a plurality of moving image content that are not related to each other, and when the user wishes to watch another piece of moving image content while watching one piece of moving image content, the user is able to continuously watch the one piece of moving image content until buffering of the other piece of moving image content is ended, and thus content may be seamlessly provided to the user.

Hereinafter, a screen 300 of the content reproducing apparatus 100, according to at least one example embodiment, will be described in detail with reference to FIGS. 3A through 5C.

Figure 3A:
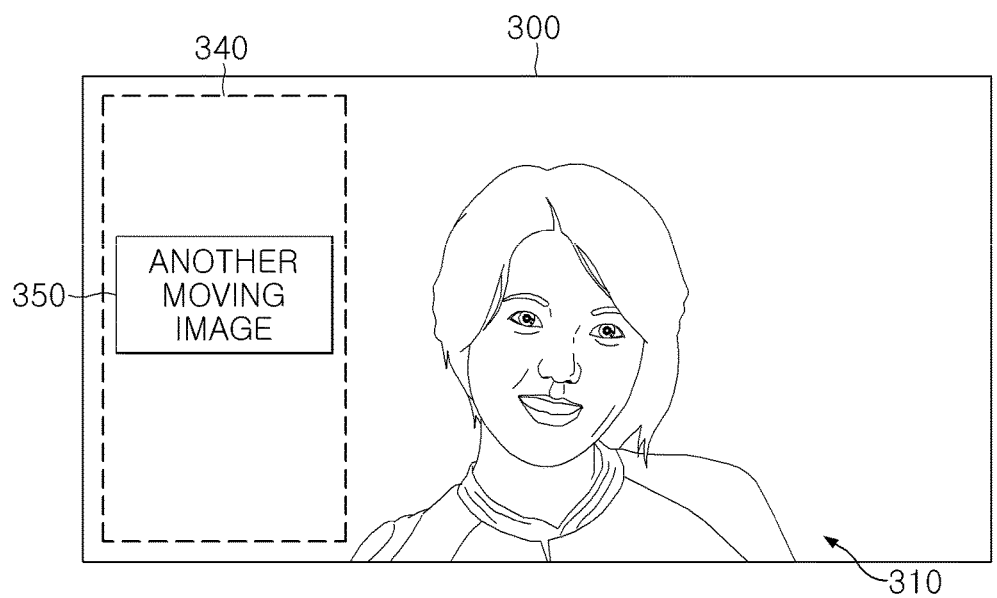
FIG. 3A is a diagram of a screen of a content reproducing apparatus reproducing first moving image content of multi-content, according to at least one example embodiment.
Figure 3B:
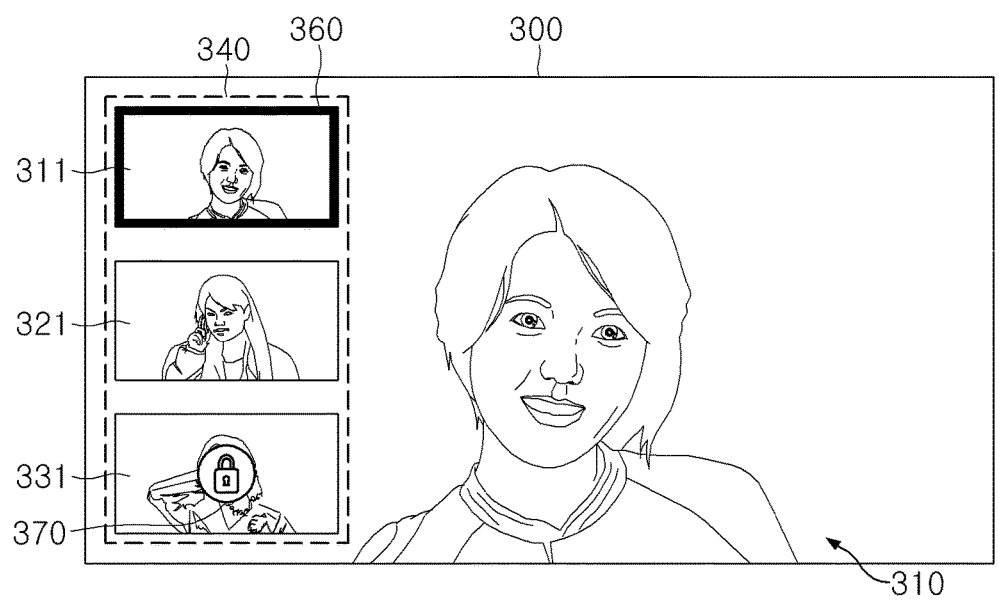
FIG. 3B is a diagram of a screen of a content reproducing apparatus displaying a plurality of thumbnail images, according to at least one example embodiment.

FIG. 3A is a diagram of a screen of a content reproducing apparatus reproducing first moving image content of multi-content, according to at least one example embodiment. FIG. 3B is a diagram of a screen of a content reproducing apparatus displaying a plurality of thumbnail images, according to at least one example embodiment, As shown in FIG. 3A, the content reproducing apparatus 100 may display an image 350 indicating that a plurality of pieces of moving image content are reproducible, in a first region 340 of the screen 300, while reproducing the first moving image content 310 of the multi-content. The image 350 of 'another moving image' shown in FIG. 3A is only an example, and an image in any one of various forms indicating that a plurality of pieces of moving image content are reproducible may be displayed in the first region 340.

As described above, when a user input with respect to the first region 340 is received, the content reproducing apparatus 100 may display the first through third thumbnail images 311 through 331 respectively corresponding to the plurality of pieces of moving image content in a second region of the screen 300. In FIG. 3B, the first region 340 and the second region are the same, and the content reproducing apparatus 100 may display the first thumbnail image 311 corresponding to the first moving image content 310, the second thumbnail image 321 corresponding to the second moving image content, and the third thumbnail image 331 corresponding to third moving image content, on the first region 340 of the screen 300.

In at least one example embodiment, an image 370 indicating that the third moving image content is charged moving image content may be displayed on the third thumbnail image 331 of FIG. 3B. The user may look at the image 370 indicating that the third moving image content is the charged moving image content, and recognize that he/she should pay to reproduce the third moving image content.

The user may watch moving image content corresponding to one of the first through third thumbnail images 311 through 331 by selecting the one of the first through third thumbnail images 311 through 331. At this time, if a thumbnail image selected by the user corresponds to the charged moving image content, the content reproducing apparatus 100 may receive payment information from the user and transmit the payment information to the content providing apparatus 200. When payment is completed on the charged moving image content, the content reproducing apparatus 100 may receive and reproduce the charged moving image content from the content providing apparatus 200.

Also, the content reproducing apparatus 100 may display an image 360 indicating reproduction in progress on the first thumbnail image 311 corresponding to the first moving image content 310 that is being reproduced, such that the user recognizes which moving image content corresponding to which thumbnail image is currently reproduced.

Figure 4:
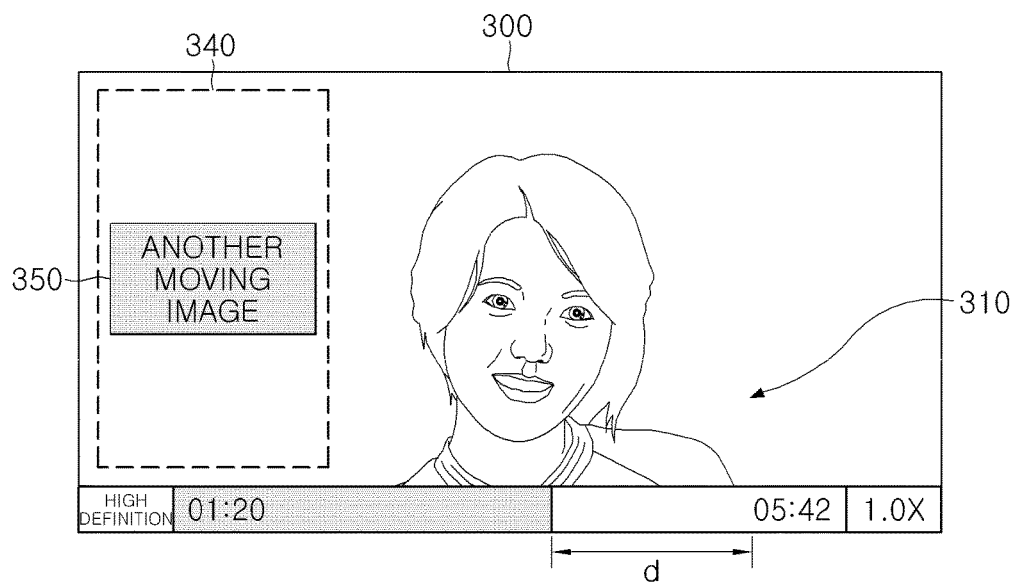
FIG. 4 is a diagram of a screen of a content reproducing apparatus reproducing first moving image content of multi-content, according to at least one example embodiment.

FIG. 4 is a diagram of a screen of a content reproducing apparatus reproducing first moving image content of multi-content, according to at least one example embodiment. In FIG. 4, the content reproducing apparatus 100 may display the image 350 indicating that the plurality of pieces of moving image content are reproducible on the first region 340 when a reproduction elapsed time of the first moving image content 310 corresponds to a given (or, alternatively pre-set) reproduction time region d.

In other words, when the first moving image content 310 and another piece of moving image content are related to each other only in the given reproduction time region d of the first moving image content 310, the image 350 indicating that the plurality of pieces of moving image content are reproducible is displayed on the screen 300 when the reproduction elapsed time of the first moving image content 310 corresponds to the given reproduction time region d. The user may input a user input with respect to the first region 340 of the screen 300 while the image 350 indicating that the plurality of pieces of moving image content are reproducible is displayed on the first region 340, so as to check a plurality of thumbnail images.

In contrast to FIG. 3A, in at least one example embodiment shown in FIG. 4, when another moving image 350 is reproducible while reproducing the first moving image content 310, the content reproducing apparatus 100 may display the image 350 on the screen 300 such that the user may easily determine that the other piece of moving image content is reproducible.

Accordingly, the content providing apparatus 200 that provides multi-content may variously configure the multi-content. For example, when the multi-content is movie content, the content providing apparatus 200 may provide main moving image content to the content reproducing apparatus 100 while relating an important scene of the main moving image content to another piece of moving image content captured at another point of view. Accordingly, the user may watch the important scene in various points of view, thereby having an experience different from general movies.

Figure 5A:
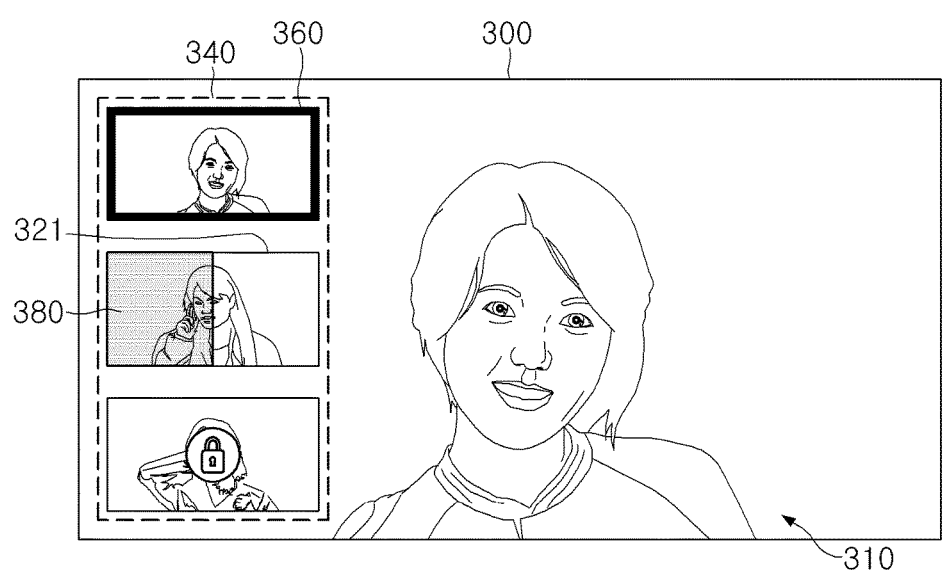
FIG. 5A is a diagram of a screen in which reproduction is changed from first moving image content to second moving image content, according to at least one example embodiment.
Figure 5B:
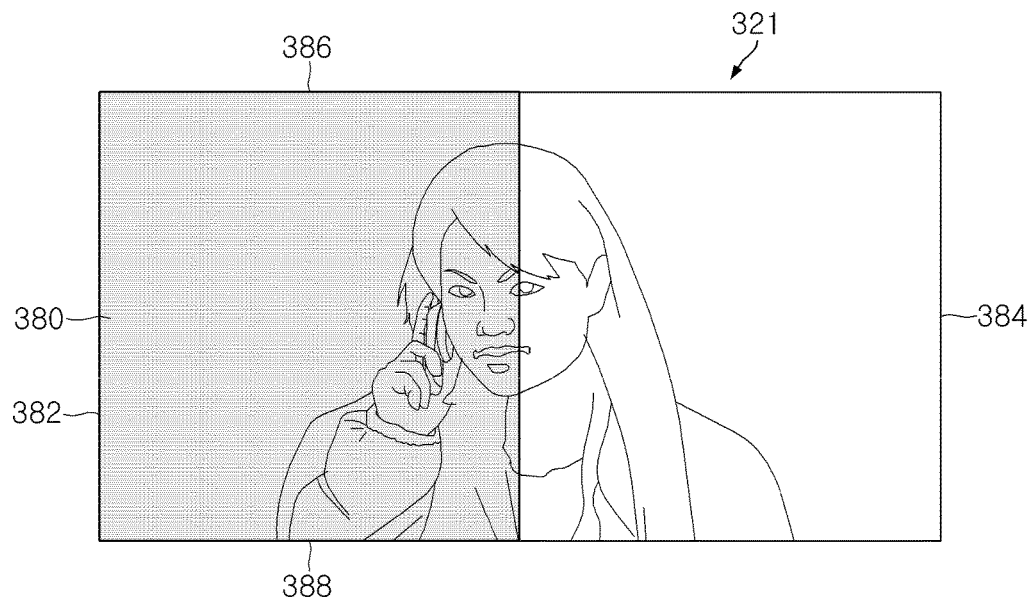
FIG. 5B is a diagram illustrating in detail a second thumbnail image, according to at least one example embodiment.
Figure 5C:
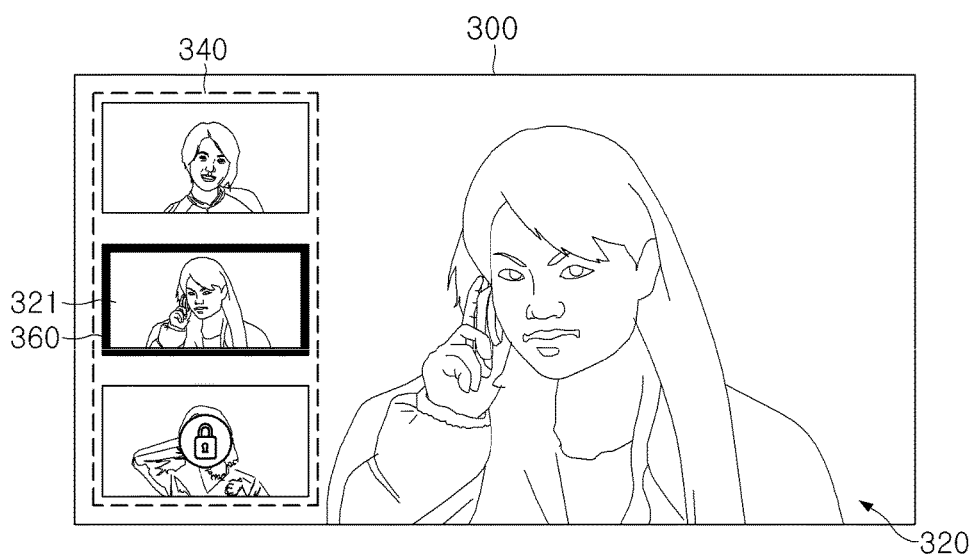
FIG. 5C is a diagram of a screen in which reproduction is changed from first moving image content to second moving image content, according to at least one example embodiment.

FIG. 5A is a diagram of a screen in which reproduction is changed from first moving image content to second moving image content, according to at least one example embodiment. FIG. 5B is a diagram illustrating in detail a second thumbnail image, according to at least one example embodiment. FIG. 5C is a diagram of a screen in which reproduction is changed from a first moving image content to a second moving image content, according to at least one example embodiment.

As shown in FIG. 5A, when a user selects a second thumbnail image 321 corresponding to the second moving image content 320 while the first moving image content 310 is reproduced, the content reproducing apparatus 100 according to at least one example embodiment, may display a buffering degree of the second moving image content 320 on the second thumbnail image 321. The content reproducing apparatus 100 may continuously reproduce the first moving image content 310 before buffering of the second moving image content 320 is completed.

In at least one example embodiment, the content reproducing apparatus 100 may display the buffering degree of the second moving image content 320 in a buffering image 380 gradually increasing from one point to another point of the second thumbnail image 321. The buffering image 380 may be a certain color. The user may look at the buffering image 380 having a size gradually increasing to predict when the second moving image content 320 will be reproduced.

FIG. 5B illustrates the buffering image 380 having a size gradually increasing from one side portion 382 to another side portion 384 of the second thumbnail image 321, but the buffering image 380 of FIG. 5B is only an example embodiment, and alternatively, the size of the buffering image 380 may gradually increase, for example, from a bottom portion 388 to a top portion 386 of the second thumbnail image 321.

In at least one example embodiment, when the buffering of the second moving image content 320 is completed, the content reproducing apparatus 100 stops reproducing the first moving image content 310 and reproduces the second moving image content 320. At this time, the content reproducing apparatus 100 may display the image 360 indicating reproduction in progress on the second thumbnail image 321 as shown in FIG. 5C.

According to at least one example embodiment, the content reproducing apparatus 100 may change the second thumbnail image 321 while buffering the second moving image content 320. For example, the content reproducing apparatus 100 may remove some of image components (a form, a shape, and a color) included in the second thumbnail image 321, add a certain image component to the second thumbnail image 321, or change some of all of the image components included in the second thumbnail image 321 to other image components.

Meanwhile, the content reproducing apparatus 100 according to at least one example embodiment may provide multi-content to the user while providing commercial content corresponding to each of a plurality of pieces of moving image content. For example, the content reproducing apparatus 100 may reproduce commercial content corresponding to first moving image content when the commercial content corresponding to the first moving image content exists before or while reproducing the first moving image content, and reproduce commercial content corresponding to second moving image content when the commercial content corresponding to the second moving image content exists before or while reproducing the second moving image content.

Since the content providing apparatus 200 may sell each of plurality of pieces of moving image content included in multi-content to an advertiser as a product for an advertisement, advertising revenues may increase.

Figure 6:
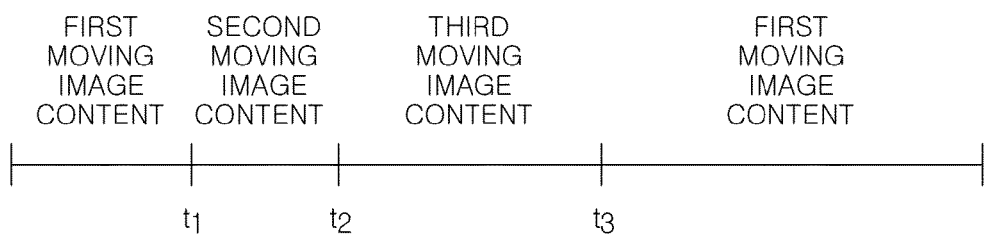
FIG. 6 is a diagram for describing a reproduction change history of a plurality of pieces of moving image content, according to at least one example embodiment.

FIG. 6 is a diagram for describing a reproduction change history of a plurality of pieces of moving image content, according to at least one example embodiment. For example, as shown in FIG. 6, the content reproducing apparatus 100 may store a reproduction change history of first moving image content when a user reproduces the first moving image content until a point of time t1, of second moving image content when a user reproduces the second moving image content until a point of time t2, and of third moving image content when a user reproduces the third moving image content until a point of time t3 and then reproduces the first moving image content until an end point.

In at least one example embodiment, the reproduction change history may be shared between users by being stored as metadata. Metadata generated by the content reproduction apparatus 100 may be shared with other users through, for example, the content providing apparatus 200 or a social network service (SNS). A user who receives the metadata may reproduce multi-content based on a reproduction order and each reproduction changed point of time included in the metadata. As a result, a user may simply edit a plurality of pieces of moving image content, and users who receive metadata may watch the edited plurality of pieces of moving image content through the metadata.

Figure 7:
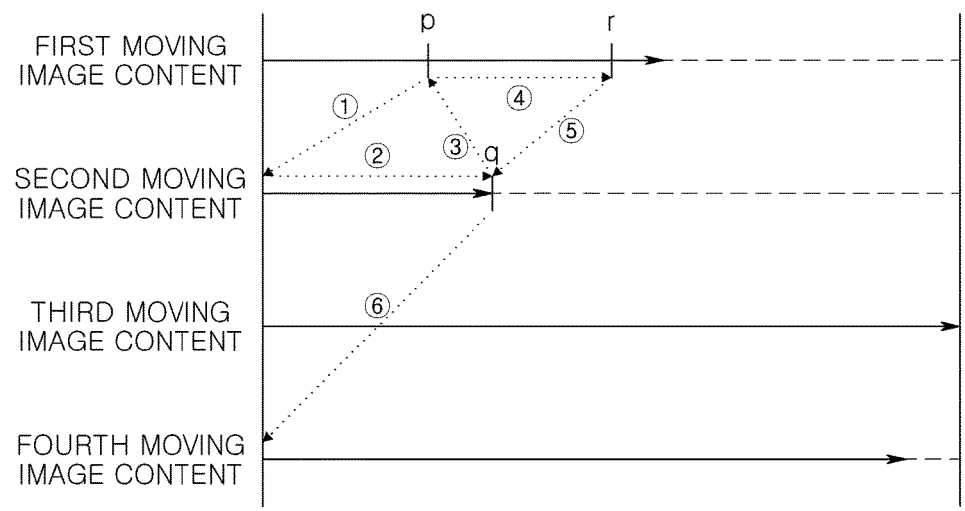
FIG. 7 is a diagram for describing a reproduction point of time when a reproduction change occurs between pieces of moving image content, according to at least one example embodiment.

FIG. 7 is a diagram for describing a reproduction point of time when a reproduction change occurs between pieces of moving image content, according to at least one example embodiment.

Referring to FIG. 7, in at least one example embodiment, when a reproduction change to second moving image content occurs according to user's selection at a point of time p while first moving image content is reproduced, the content reproducing apparatus 100 may reproduce the second moving image content from a starting point of the second moving image content (①).

Then, when a reproduction change to the first moving image content occurs again by the user at a point of time the second moving image content is reproduced to a point q (②), the content reproducing apparatus 100 may reproduce the first moving image content continuously from the point of time p that is a previous end point of the first moving image content (③).

Then, when a reproduction change to the second moving image content from the first moving image content occurs again by the user at a point of time the first moving image content is reproduced to a point r (④), since the second moving image content is already reproduced to the point q that is an end point, the content reproducing apparatus 100 may display a reproduction terminated screen indicating that reproduction of the second moving image content is completed (⑤). Then, the user may select whether to watch the second moving image content from the beginning or to change reproduction to another piece of moving image content.

Then, when the user selects to change reproduction to the fourth moving image content, the content reproducing apparatus 100 may reproduce the fourth moving image content from a starting point of the fourth moving image content that was not reproduced before (⑥).

According to at least another example embodiment, when a reproduction change from the first moving image content to the second moving image content occurs, the second moving image content may be reproduced from a reproduction point corresponding to a reproduction elapsed point of time of the first moving image content. For example, when a reproduction change to the second moving image content occurs after the first moving image content is reproduced up to 20 seconds, the content reproducing apparatus 100 may reproduce the second moving image content from a point of time at which 20 seconds have passed. A reproduction point of time of the second moving image content corresponding to the reproduction elapsed point of time of the first moving image content may be determined using known methods.

Accordingly, when a user reproduces a plurality of pieces of moving image content while listening to audio content having one source, a reproduction change between pieces of moving image content may occur while reproducing of the audio content being listened to is maintained even when a reproduction change from first moving image content to second moving image content occurs. For example, when a user is watching music videos captured in various versions, the user may watch the various music videos and switch between the various music videos while continuously listening to audio content of the music videos without experiencing any interruption in the audio content.

Figure 8:
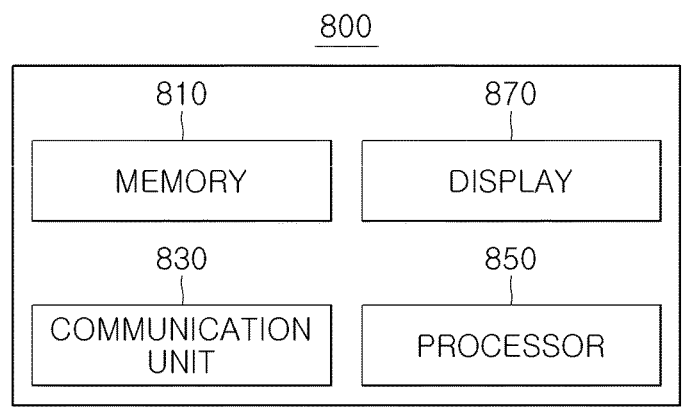
FIG. 8 is a block diagram of a content reproducing apparatus, according to at least one example embodiment.

FIG. 8 is a block diagram of a content reproducing apparatus, according to at least one example embodiment.

Referring to FIG. 8, the content reproducing apparatus 800 according to an example embodiment may include a memory 810, a communication unit 830, a processor 850, and a display 870.

First, the memory 810 stores at least one program. The at least one program stored in the memory 810 may include a content reproducing program.

The communication unit 830 receives the content reproducing program and a plurality of pieces of moving image content included in multi-content from the content providing apparatus 200.

The processor 850 executes the content reproducing method described above under control of the content reproducing program stored in the memory 810.

In detail, the processor 850 reproduces first moving image content included in the multi-content, which is selected by a user, on a screen of the display 870.

Then, the processor 850 displays a plurality of thumbnail images respectively corresponding to the plurality of pieces of moving image content included in the multi-content on a second region of the screen according to a user input with respect to a first region of the screen.

The processor 850 controls the communication unit 830 to buffer second moving image content corresponding to a thumbnail image selected by the user while the first moving image content is continuously reproduced, based on an input of the user selecting the thumbnail image corresponding to the second moving image content from among the plurality of thumbnail images. When the buffering of the second moving image content is completed, the processor 850 controls the communication unit 830 to reproduce the second moving image content instead of the first moving image content.

Since a user interface (UI) displayed on the screen of the display 870 has been described above, details thereof are not repeated here.

Hereinafter, operations of the content providing apparatus 200 according to at least one example embodiment will be described in detail with reference to FIG. 9.

FIG. 9 is a flowchart of a content providing method, according to at least one example embodiment.

The content providing apparatus 200 may include a memory in which a program for executing the content providing method is stored, and a processor and a communication unit controlled by the program stored in the memory.

At S910, the content providing apparatus 200 transmits a content reproducing program to the content reproducing apparatus 100. The content providing apparatus 200 may receive a request from the content reproducing apparatus 100 for the content reproducing program.

At S920, the content providing apparatus 200 transmits first moving image content included in multi-content, which is selected by the content reproducing apparatus 100 through the content reproducing program, to the content reproducing apparatus 100. When commercial content corresponding to the first moving image content exists, the content providing apparatus 200 may transmit the commercial content corresponding to the first moving image content to the content reproducing apparatus 100.

The content providing apparatus 200 may store a plurality of pieces of moving image content included in the multi-content, wherein the plurality of pieces of moving image content may be received from an external content provider.

When the multi-content is selected by the user, the content reproducing program may reproduce the first moving image content received from the content providing apparatus 200. According to at least one example embodiment, when the multi-content is selected by the user, a plurality of thumbnail images respectively corresponding to the plurality of pieces of moving image content may be received from the content providing apparatus 200 and displayed on a screen of the content reproducing apparatus 100, and the first moving image content corresponding to a thumbnail image selected by the user may be reproduced.

At S930, when one of the plurality of thumbnail images is selected by the content reproducing apparatus 100 while the plurality of thumbnail images are displayed on a second region of the screen and the first moving image content is being reproduced by the content reproducing apparatus 100, second moving image content corresponding to the selected one of the plurality of thumbnail images is transmitted to the content reproducing apparatus 100. At this time, the content reproducing program may continuously reproduce the first moving image content until buffering of the second moving image content is completed, and when the buffering of the second moving image content is completed, the content reproducing program may reproduce the second moving image content instead of the first moving image content.

The content reproducing program may display a buffering degree of the second moving image content on the selected one of the plurality of thumbnail images or change the selected one of the plurality of thumbnail images, while buffering the second moving image content.

When commercial content corresponding to the second moving image content exists, the content providing apparatus 200 may transmit the commercial content corresponding to the second moving image content to the content reproducing apparatus 100.

Meanwhile, the content providing apparatus 200 may receive commercial content corresponding to each of the plurality of pieces of moving image content included in the multi-content from an advertiser terminal. The advertiser terminal is a terminal device used by an advertising company, and a number of the advertiser terminals may be one or more. A plurality of advertiser terminals may be respectively used by different advertising companies.

An advertiser terminal may select moving image content for advertisement, and the content providing apparatus 200 may transmit commercial content received from the advertiser terminal together with the moving image content to the content reproducing apparatus 100 when the advertiser terminal pays for the advertisement with respect to the moving image content.

Also, when the content providing apparatus 200 receives a request to change one piece of moving image content from among the plurality of pieces of moving image content included in the multi-content to be charged from a content provider terminal, the content providing apparatus 200 may not immediately transmit the one piece of moving image content to the content reproducing apparatus 100 even if the content reproducing apparatus 100 selects a thumbnail image corresponding to the one piece of moving image content, but may transmit the one piece of moving image content to the content reproducing apparatus 100 only when a user of the content reproducing apparatus 100 pays for the one piece of moving image content.

A content reproducing apparatus and method, and a content providing apparatus and method according to example embodiments may increase consumption of users on moving image content by providing a new type of moving image content to the users.

Also, a content reproducing apparatus and method, and content providing apparatus and method according to example embodiments a UI function for increasing user convenience.

Also, a content reproducing apparatus and method, and a content providing apparatus and method according to example embodiments may increase profitability of a content providing company or an advertiser.

Meanwhile, example embodiments described above may be drafted into computer-executable programs, and may be embodied within a conventional digital computer for operating the program using a computer-readable recording medium.

The computer-readable recording medium may include storage media such as a magnetic storage medium (e.g., ROMs, floppy disks, hard disks, etc.), an optically readable medium (e.g., CD ROMs, DVDs, etc.), and a carrier wave (e.g., transmission via the internet).

The content reproducing device 100 (also content reproducing device 800) as well as the content providing device 200 described above is a physical hardware device that is capable of running one or more applications. Each of the content reproducing device 100/800 and the content providing device 200 may include a transmitter/receiver (or alternatively, a transceiver), memory, one or more processors, and/or other like components. Each of the content reproducing device 100/800 and the content providing device 200 may be configured to send/receive data to/from one another. Each of the content reproducing device 100/800 and the content providing device 200 may include one or more processors that are designed to sequentially and automatically carry out a sequence of arithmetic or logical operations; equipped to record/store digital data on a machine readable medium; and transmit and receive digital data. The one or more processors may be configured to carry out instructions of a computer program by performing the basic arithmetical, logical, and input/output operations of the system. The one or more processors may include a single-core processor, a dual-core processor, a triple-core processor, a quad-core processor, etc. The one or more processors may perform a variety of functions for each of the content reproducing device 100/800 and the content providing device 200 and may process data by executing program code, one or more software modules, firmware, middleware, microcode, hardware description languages, and/or any other like set of instructions stored in the memory. The program code may be provided to the one or more processors by memory, one or more drive mechanisms (not shown), and/or via a network interface. In order to perform the variety of functions and data processing operations, the program code and/or software components are loaded into the one or more processors. Once the program code is loaded into the one or more processors, the one or more processors may be programmed to perform the various operations and functions delineated by the program code, thereby transforming the one or more processors into a special purpose processor.

Although example embodiments have been described for illustrative purposes, those skilled in the art will appreciate that various modifications, additions and substitutions are possible, without departing from the scope and spirit of inventive concepts as disclosed in the accompanying claims. Therefore, example embodiments are disclosed only for illustrative purposes and should not be construed as limiting inventive concepts.

What is claimed is:

1. A content reproducing apparatus comprising:
a display;
a memory configured to store at least one program; and
at least one processor configured to execute the at least one program to,
reproduce first moving image content on a screen of the display and play audio associated with a first source,
display an image on a first region of the screen, indicating that a plurality of moving image content are reproducible during a portion of a reproduction time of the first moving image content, the portion of the reproduction time being a time period in which the first moving image content and the plurality of moving image content overlap, the plurality of moving image content each including audio and video content, each of the audio content associated with separate sources,
according to a user input, with respect to the first region of the screen, display a plurality of thumbnail images corresponding to the plurality of moving image content, on a second region of the screen, the plurality of thumbnail images being still images,
buffer a second moving image content corresponding to one of the plurality of thumbnail images, the first moving image content being continuously reproduced while the second moving image content is being buffered,
reproduce the second moving image content instead of the first moving image content when the buffering of the second moving image content is completed,
change the one of the plurality of thumbnail images associated with the second moving image content while the second moving image content is buffered, the change including removing or adding an image component to the changed thumbnail image,
determine whether the first moving image content and the second moving image content are related to each other,
continue to play the audio associated with the first source while reproducing the second moving image content when the first moving image content and the second moving image content are related to each other, and
seamlessly reproduce the audio content of the second moving image content instead of the audio associated with the first source when the first moving image content and the second moving image content are not related.

2. The content reproducing apparatus of claim 1, wherein the at least one processor is configured to display a buffering degree of the second moving image content on the one of the plurality of thumbnail images displayed on the second region.

3. The content reproducing apparatus of claim 2, wherein the at least one processor is configured to display the buffering degree by gradually increasing a buffer degree indicator from one point on the one of the plurality of thumbnail images to another point on the one of the plurality of thumbnail images.

4. The content reproducing apparatus of claim 3, wherein the one point is one edge of the one of the plurality of thumbnail images, and the other point is another edge of the one of the plurality of thumbnail images.

5. The content reproducing apparatus of claim 1, wherein when the second moving image content has to be paid for prior to being reproduced, the at least one processor is configured to display an image on the one of the plurality of thumbnail images indicating that the second moving image content has to be paid for prior to being reproduced.

6. The content reproducing apparatus of claim 5, wherein the at least one processor is configured to buffer the second moving image content after the second moving image content is paid for.

7. The content reproducing apparatus of claim 1, wherein the at least one processor is configured to display an image indicating that the plurality of moving image content are reproducible on the first region of the screen before displaying the plurality of thumbnail images on the second region of the screen.

8. The content reproducing apparatus of claim 7, wherein the at least one processor is configured to display the plurality of thumbnail images on the second region of the screen only when a user input with respect to the first region of the screen is received while the image indicating that the plurality of moving image content are reproducible is displayed on the first region of the screen.

9. The content reproducing apparatus of claim 1, wherein the at least one processor is configured to,
reproduce commercial content corresponding to the first moving image content when the commercial content corresponding to the first moving image content exists, and
reproduce commercial content corresponding to the second moving image content when the commercial content corresponding to the second moving image content exists.

10. The content reproducing apparatus of claim 1, wherein the at least one processor is configured to buffer the second moving image content based on an amount of time over which the first moving image content is being displayed.

11. The content reproducing apparatus of claim 1, wherein the at least one processor is further configured to:
store a reproduction change history of each of the plurality of moving image content in the memory as metadata, the reproduction change history including reproduction orders associated with the plurality of moving image content and time information associated with each of the reproduction orders; and
transmit the reproduction change history to a second user for reproduction of the plurality of moving image content based on the reproduction orders and the time information.

12. The content reproducing apparatus of claim 1, wherein the at least one processor is configured to buffer the second moving image content based on a point of time at which a previous reproduction of the second moving image content was terminated.

13. The content reproducing apparatus of claim 12, wherein, when the previous reproduction of the second moving image content has been completed, the at least one processor is configured to display a display termination image on the screen indicating that the reproduction of the second moving image content has been completed.

14. The content reproducing apparatus of claim 1, wherein the at least one processor is configured to display an image indicating that the reproduction of the first moving image content is in progress, the at least one processor displaying the image on one of the plurality of thumbnail images corresponding to the first moving image content.

15. The content reproducing apparatus of claim 14, wherein, while the second moving image content is reproduced, the at least one processor is configured to display another image indicating that the reproduction of the second moving image content is in progress, the at least one processor displaying the other image on the one of the plurality of thumbnail images corresponding to the second moving image content.

16. The content reproducing apparatus of claim 1, wherein the at least one processor is configured to store a reproduction change history of each of the plurality of moving image content in the memory.

17. A content reproducing method performed by a content reproducing apparatus, the content reproducing method comprising:
   reproducing on a screen, first moving image content and play audio associated with a first source;
   displaying an image on a first region of the screen, indicating that a plurality of moving image content are reproducible during a portion of a reproduction time of the first moving image content, the portion of the reproduction time being a time period in which the first moving image content and the plurality of moving image content overlap, the plurality of moving image content each including audio and video content, each of the audio content associated with separate sources;
   according to a user input with respect to the first region of the screen, displaying a plurality of thumbnail images corresponding to the plurality of moving image content, on a second region of the screen the plurality of thumbnail images being still images;
   buffering a second moving image content corresponding to one of the plurality of thumbnail images, the first moving image content being continuously reproduced while the second moving image content is being buffered;
   reproducing the second moving image content instead of the first moving image content when the buffering completes the buffering of the second moving image content;
   changing the one of the plurality of thumbnail images associated with the second moving image content while the second moving image content is buffered, the changing including removing or adding an image component to the changed thumbnail image;
   determining whether the first moving image content and the second moving image content are related to each other;
   continuing to play the audio associated with the first source while reproducing the second moving image content when the first moving image content and the second moving image content are related to each other; and
   seamlessly reproduce the audio content of the second moving image content instead of the audio associated with the first source when the first moving image content and the second moving image content are not related.

18. A non-transitory computer readable medium including computer-program product, the computer-program product comprising instructions which when executed by at least one processor causes the at least one processor to perform the method of claim 17.

19. A content providing method performed by a content providing apparatus, the content providing method comprising:
   transmitting a content reproducing program to a content reproducing apparatus according to a request received from the content reproducing apparatus;
   transmitting first moving image content and audio associated with a first source selected by the content reproducing apparatus through the content reproducing program, to the content reproducing apparatus; and
   transmitting a second moving image content to the content reproducing apparatus, according to a user input received via the content reproducing apparatus, the user input indicating a selection of one of a plurality of thumbnail images displayed on a screen of the content reproducing apparatus, the plurality of thumbnail images respectively corresponding to one of the plurality of moving image content, the plurality of moving image content each including audio and video content, each of the audio content associated with separate sources, the plurality of thumbnail images being still images, wherein,
   while the second moving image content is being buffered, the content reproducing program maintains reproducing the first moving image content and changes the one of the plurality of thumbnail images associated with the second moving image content, the change including removing or adding an image component to the changed thumbnail image,
   determine whether the first moving image content and the second moving image content are related to each other,
   when buffering of the second moving image content is completed, the content reproducing program reproduces the second moving image content instead of the first moving image content,
   continues to play the audio associated with the first source while reproducing the second moving image content when the first moving image content and the second moving image content are related to each other, and
   seamlessly reproduce the audio content of the second moving image content instead of the audio associated with the first source when the first moving image content and the second moving image content are not related,
   the content reproducing apparatus displays an image indicating that the plurality of moving image content are reproducible during a portion of a reproduction time of the first moving image content, the portion of the reproduction time being a time period in which the first moving image content and the plurality of moving image content overlap, and
   according to a user input with respect to the displayed image, the content reproducing apparatus displays the plurality of thumbnail images corresponding to the plurality of moving image content.

20. A non-transitory computer readable medium including a computer-program product, the computer-program product comprising instructions which when executed by at least one processor, causes the at least one processor to perform the method of claim 19.

* * * * *